(12) United States Patent
de Tremiolles et al.

(10) Patent No.: US 6,782,373 B2
(45) Date of Patent: Aug. 24, 2004

(54) METHOD AND CIRCUITS FOR ASSOCIATING A NORM TO EACH COMPONENT OF AN INPUT PATTERN PRESENTED TO A NEURAL NETWORK

(75) Inventors: Ghislain Imbert de Tremiolles, Saint-Paul (FR); Pascal Tannhof, Fontainebleau (FR)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 09/682,035

(22) Filed: Jul. 12, 2001

(65) Prior Publication Data

US 2002/0059150 A1 May 16, 2002

(30) Foreign Application Priority Data

Jul. 13, 2000 (EP) ............................................ 00480064

(51) Int. Cl.⁷ ................................................ G06N 3/02
(52) U.S. Cl. ............................... 706/15; 706/26; 706/27
(58) Field of Search ............................ 706/15, 14, 26, 706/27; 705/14

(56) References Cited

U.S. PATENT DOCUMENTS 5,621,863 A  *  4/1997  Boulet et al. ................. 706/26
5,740,326 A  *  4/1998  Boulet et al. ................. 706/27
6,134,532 A  * 10/2000  Lazarus et al. ............... 705/14
6,347,309 B1 *  2/2002  De Tremiolles et al. ...... 706/20

* cited by examiner

Primary Examiner—Wilbert L. Starks, Jr.
(74) Attorney, Agent, or Firm—Derek S. Jennings

(57) ABSTRACT

The method and circuits of the present invention aim to associate a norm to each component of an input pattern presented to an input space mapping algorithm based artificial neural network (ANN) during the distance evaluation process. The set of norms, referred to as the "component" norms is memorized in specific memorization means in the ANN. In a first embodiment, the ANN is provided with a global memory, common for all the neurons of the ANN, that memorizes all the component norms. For each component of the input pattern, all the neurons perform the elementary (or partial) distance calculation with the corresponding prototype components stored therein during the distance evaluation process using the associated component norm. The distance elementary calculations are then combined using a "distance" norm to determine the final distance between the input pattern and the prototypes stored in the neurons. In another embodiment, the set of component norms is memorized in the neurons themselves in the prototype memorization means, so that the global memory is no longer physically necessary. This implementation allows to significantly optimize the consumed silicon area when the ANN is integrated in a silicon chip.

11 Claims, 9 Drawing Sheets

METHOD AND CIRCUITS FOR ASSOCIATING A NORM TO EACH COMPONENT OF AN INPUT PATTERN PRESENTED TO A NEURAL NETWORK

BACKGROUND OF INVENTION

1. Field of the Invention

The present invention relates to artificial neural networks (ANNs) and more particularly to a method and circuits for associating a norm to each component of an input pattern presented to an input space mapping algorithm based artificial neural network. According to that method, the use of different types of norms is allowed in the distance evaluation process in order to adapt the calculation of the elementary (or partial) distance for each component of the input pattern presented to such a neural network during the distance evaluation process.

2. Background of the Invention

In today's data processing, a lot of recognition, prediction, and computation tasks are performed using reference databases used to characterize input data. Depending upon the problem to be solved, these reference databases contain patterns that are sub-images, sub-signals, subsets of data and combination thereof. The patterns that are stored in these reference databases are referred to herein below as prototypes. As known for those skilled in the art, they are generally represented by a vector, i.e. an array in a p-dimensional space. Well-known methods for characterizing new (unknown) patterns, referred to herein below as input patterns, using reference databases are based upon the input space mapping algorithms like the K-Nearest-Neighbor (KNN) or the Region Of Influence (ROI). The base principle of these algorithms is to compute the distance (dist) between the input pattern and each of the stored prototypes in order to find the closest one(s) depending or not upon predetermined thresholds. U.S. Pat. No. 5,621,863, assigned to IBM Corp and incorporated herein by reference, describes artificial neural networks based on such input space mapping algorithms that include innovative elementary processors of a new type, referred to as the ZISC neurons (ZISC is a registered trade mark of IBM Corp). An essential characteristic of the ZISC neurons lies in their ability to work in parallel, i.e. when an input pattern is presented to the ANN, all ZISC neurons compute the distance between the input pattern and their stored prototypes at the same time. One important aspect of these algorithms is the distance evaluation relation, referred to as the "norm", that is used in the distance evaluation process. The choice of this norm is determined by the problem to be solved on the one hand, and on the other hand by the knowledge used to solve this problem. In a ZISC neuron, the distance between an input pattern A and the prototype B stored therein (each having p components) is calculated using either the MANHATTAN distance (L1 norm), i.e. dist=sum(abs($A_k$−$B_k$)) or the MAXIMUM distance (Lsup norm), i.e. dist=max(abs($A_k$−$B_k$)) wherein $A_k$ and $B_k$ are the components of rank k (variable k varies from 1 to p) for the input pattern A and the stored prototype B respectively. Note that "abs" is an usual abbreviation for "absolute value". Other norms exist, for instance the L2 norm such as dist=square root(sum($A_k$−$B_k$)$^2$). The L2 norm is said to be "Euclidean" while the L1 and Lsup norms are examples of "non-Euclidean" norms, however, they all imply the handling of a difference ($A_k$−$B_k$) for each component in the distance relation. Other Euclidean or non-Euclidean norms (such as the match/no match) are known for those skilled in the art in the ANN field. In the ZISC neuron, the selection between the L1 or Lsup norm is determined by the value of a single bit referred to as the "norm" bit No stored in the neuron.

On the other hand, the notion of "context" was a novel concept introduced by the ZISC neuron. The context can be advantageously used to differentiate different types of input patterns. For instance, the context may be used to distinguish between the upper case and the lower case characters (or to distinguish between different type fonts). In the ZISC neuron, this approach is implemented with a local context Cxt stored in the neuron and a global context CXT held in a common register of the ZISC chip. As a consequence, the context approach will allow to select neurons having learned with a determined context and to inhibit all others in the ANN. During the recognition, the global context value is compared with the local context stored in each neuron, if found identical, the neuron will be selected, otherwise it will be inhibited. As a result, the context allows to configure the ANN either as a single neural network or as an arrangement of separate groups of neurons wherein all the neurons of a group have the same local context. As far as ZISC neurons are concerned, the context (local or global) is a value coded on 7 bits.

In the ZISC neuron, there is thus a specific register, referred to as the local norm/context (No/cxt) register which stores the 1-bit norm No and 7-bit context cxt signals. At the end of the engagement/learning process, the content of the local norm/context register is automatically loaded with the global norm/context stored in the ANN. The 1-bit norm and the 7-bit context signals are applied to the control logic circuits of the ZISC chip.

So far, only one norm has been used for the totality of the components of a stored prototype. In the ZISC neuron, the norm that is applied to each component uses the operator "absolute value of a difference". Then, the successive values are summed in the case of the L1 norm or the maximum value thereof is selected in the case of the Lsup norm. However, due to the nature of the components, in some instances, it should be worthwhile to associate a norm that could be different for each component of the input pattern/stored prototype depending upon the application. For example, if the two components of a stored prototype characterizing a sub-image describe a color index and the number of pixels of that color index in the sub-image respectively, it would be useful to apply the match/no match norm for the color index related component and an absolute value based norm for the number of pixels related component. The main difficulty dealing with this approach when using conventional ANNs is the considerable amount of memory and logic circuits that would be required in the silicon chip to associate different norms to the components of the input vector/stored prototype and to conduct the distance evaluation process in these particular conditions.

As a result, no technique allowing this highly desired feature is known to date. As a matter of fact, the artificial neural networks described in the aforementioned U.S. patent allow to utilize only one norm per neuron which is thus the same for all the components of a stored prototype. This is a serious limit to extend the use of conventional input space mapping algorithm based neural networks and in particular of ANNs constructed with ZISC neurons when it is required to handle input patterns/stored prototypes having components of different nature.

SUMMARY OF INVENTION

It is therefore a primary feature of the present invention to provide a method and circuits for associating a norm to each component of an input pattern presented to an input space mapping algorithm based artificial neural network.

It is another feature of the present invention to provide a method and circuits for associating a norm to each component of an input pattern presented to an input space mapping algorithm based artificial neural network to allow the use of different norms in the distance evaluation process.

It is another feature of the present invention to provide a method and circuits for associating a norm to each component of an input pattern presented to an input space mapping algorithm based artificial neural networks when it is required to handle input patterns having components of different nature.

It is another feature of the present invention to provide a method and circuits for associating a norm to each component of an input pattern presented to an input space mapping algorithm based artificial neural network wherein all the norms are memorized in a global memory.

It is still another feature of the present invention to provide a method and circuits for associating a norm to each component of an input pattern presented to an input space mapping algorithm based artificial neural network which are adapted to handle several sets of norms.

It is still another feature of the present invention to provide a method and circuits for associating a norm to each component of an input pattern presented to an input space mapping algorithm based artificial neural network wherein the norms are memorized in the neurons.

The accomplishment of these and other related features are achieved by the method and circuits of the present invention which aim to associate a norm to each component of an input pattern presented to an input space mapping algorithm based artificial neural network (ANN). The set of norms, referred to as the "component" norms is memorized in specific memorization means in the ANN. In a first embodiment, the improved ANN is provided with a global memory, common for all the neurons, that memorizes all the component norms. For each component of the input pattern, the neuron may choose between either a local component norm stored locally in the neuron or a global component norm stored in the global memory to perform the elementary (or partial) calculation in the distance evaluation process. The elementary calculations are then combined using a "distance" norm to determine the final distance between the input pattern and each of the stored prototypes. In a second embodiment, the set of component norms is memorized in the neurons themselves. This implementation allows to significantly optimize the consumed silicon area when the ANN is integrated in a silicon chip. The prototype component memorization means of the neurons are thus adapted to fulfill the global memory function, so that a specific global memory is no longer physically necessary.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION

Figure 1:
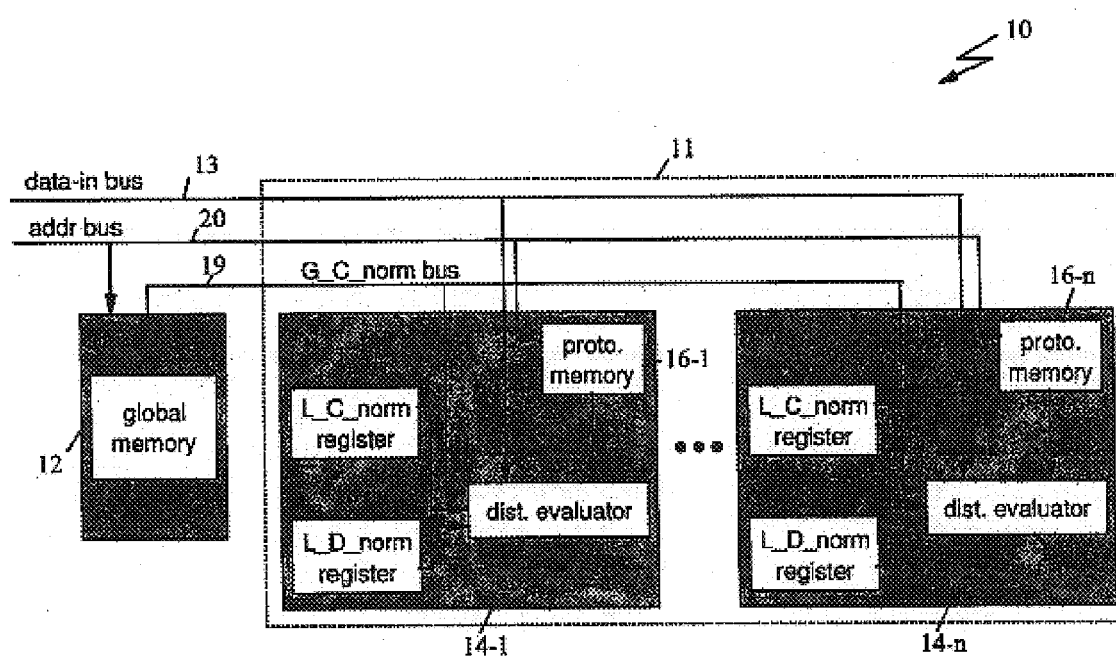
FIG. 1 schematically shows the block architecture of an improved artificial neural network (ANN) which includes a global memory to memorize the set of component norms associated to the components of the input pattern/stored prototypes and a plurality of neurons according to the present invention.

The basic principle of the present invention is to use a norm (i.e. an operator as mentioned above) that is associated to each component of the input pattern/stored prototype in the distance evaluation process. This norm (which can be thus different for each component) will be referred to herein below as the "component" norm or C_norm in short. The C_norm is stored either locally in the neuron or in a "global memory" common to the whole ANN. In this case, the global memory memorizes the whole set of C_norms, so that for a determined input pattern component, the same norm is associated to all the neurons. The C_norm will be labeled "local C_norm" in the first case and "global C_norm" in the second case, or L_C_norm and G_C_norm in short respectively. When an input pattern is compared with a stored prototype in a neuron, the processing of each pair of corresponding components (Ak,Bk) using the C_norm associated therewith provides an elementary (or partial) distance value. The elementary distance values that are obtained for each component are combined to provide a final distance value using a second norm referred to as the "distance" norm. For example, in the L1 norm, the C_norm is the "absolute value" operator and the distance norm is the "addition" operator. In the Lsup norm, if the C_norm is still the "absolute value" operator, the distance norm now is the "maximum value" operator. Depending upon the nature of the component and distance norms, the final value can be considered either as a distance in a pure mathematical sense (e.g. if the L1 or Lsup norm is used) or not. However, for the sake of simplicity with regards to the above mentioned U.S. patent, the terms "distance" and "norm" that will be used in the following description must be rather understood as generic. In other words, the resulting value of the comparison between an input vector and a stored prototype will be referred to as a "distance" even if it does not fully meet all the criteria of a mathematical definition. The following description will be made by reference to said "distance" norm, which will be labeled L_D_norm in short, when it is locally stored in each neuron and G_D_norm when it is common to all the neurons of the ANN.

In essence, the global memory (typically a set of registers) is an independent memory. The innovative solution described herein below neither increases the number of Input/Output terminals (I/Os) in the silicon chip nor it requires specific data preprocessing (in the recognition phase) in the host computer. Furthermore, the added amount of memory is very small compared to the prototype component memorization means that exist in all neurons, i.e. the sum of all the prototype memories placed in the neurons composing the ANN. As a result, this principle can be implemented without increasing (1) the preprocessing time of the data in the host computer, (2) the complexity of the evaluation/memorization means, and (3) the number of I/Os in the silicon chip that integrates the ANN. In addition, the silicon area can be further optimized by dedicating one neuron (or more) to fulfill this memory function as it will be explained in more details in due course later on.

FIG. 1 schematically shows the block architecture of an improved artificial neural network (ANN) 10 according to a first embodiment of the present invention. ANN 10 is comprised of an ANN 11 and the global memory mentioned just above that is referenced 12. Global memory 12 is designed to store p component norms (i.e. one per component). Data coming from the host computer or the control logic (not shown) are fed into the ANN 11 via data-in bus 13 as standard. ANN 11 is comprised of a plurality of n independent neurons 14-1 to 14-n, generically referenced 14. In the particular implementation shown in FIG. 1, neuron 14 is basically a conventional ZISC neuron that has been only slightly modified. In FIG. 1, each neuron, e.g. 14-1, includes a distance evaluator 15-1 and a local memory 16-1 to store the prototype components, usually referred to as the prototype memory. The distance evaluator 15-1 is connected to the host computer via the data-in bus 13 and to its prototype memory 16-1 to perform the distance evaluation between the input pattern and the stored prototype by processing each pair of corresponding components as standard to calculate the elementary distance. It further includes registers 17-1 and 18-1 to memorize L_C_norms and L_D_norms respectively that are used to perform this elementary distance calculation. An alternative would be to have a single register common for the whole ANN 10 feeding each neuron 14 with the G_D_norm via a dedicated bus. At this stage of the description, the architecture of ANN 11 and the internal construction of neuron 14-1 (if we except register 17-1) are substantially those described in details in the aforementioned U.S. patent. However, with respect to that document, the structure of a ZISC neuron has been modified to take into account that the distance evaluator now referenced 15-1 is connected to the global memory 12 via a bus referred to as the G_C_norm bus 19 and to said register 17-1. In addition, the address bus referenced 20 is not only connected to the prototype memory placed in each of neurons 14-1 to 14-n as practiced in the ZISC chip but also to the global memory 12, so that for each input pattern component, the corresponding norm associated therewith can be output therefrom.

It is to be noted that several improved ANNs 10 can be combined in a single one which would thus include either several global memories (one per improved ANN) or only one global memory common for all. On the other hand, it could also be envisioned an improved ANN 10 wherein the global memory function is duplicated in each neuron to memorize the specific C_norms for the prototype stored therein.

Still referring to FIG. 1, the principle of improved ANN 10 operation is relatively simple. For the sake of illustration, let us assume that the global memory 12 is constructed by a set of registers as standard. Using the hypothesis that input pattern components are presented in a sequential way to the improved ANN 10, each time the host computer presents an input pattern component to the improved ANN 10 via data-in bus 13, it points on a determined address in the global memory 12 to output the corresponding G_C_norm and in all the prototype memories 16-1 to 16-n via addr bus 20 to select the corresponding prototype component. As a result, in each neuron 14, the G_C_norm (or L_C_norm), the stored prototype component, and the input pattern component corresponding to that address are simultaneously made available in the distance evaluator 15. Each neuron 14 then performs the elementary (or partial) distance calculation between the input pattern component and the corresponding stored prototype component using the associated G_C_norm (or L_C_norm). Elementary distances are combined to update the distance with the selected L_D_norm as standard. This process is continued in sequence until all the components of the input pattern have been processed and the final distance value has been obtained.

It is to be understood that the same method could be used when the input pattern components are presented to the improved ANN 10 in a parallel manner. Still another way of implementing the present invention would also be to associate the G_C_norms and the input pattern components in the host computer in order to be fed together to the improved ANN 10. In this case, the global memory function would be embedded in the host computer itself.

Figure 2:
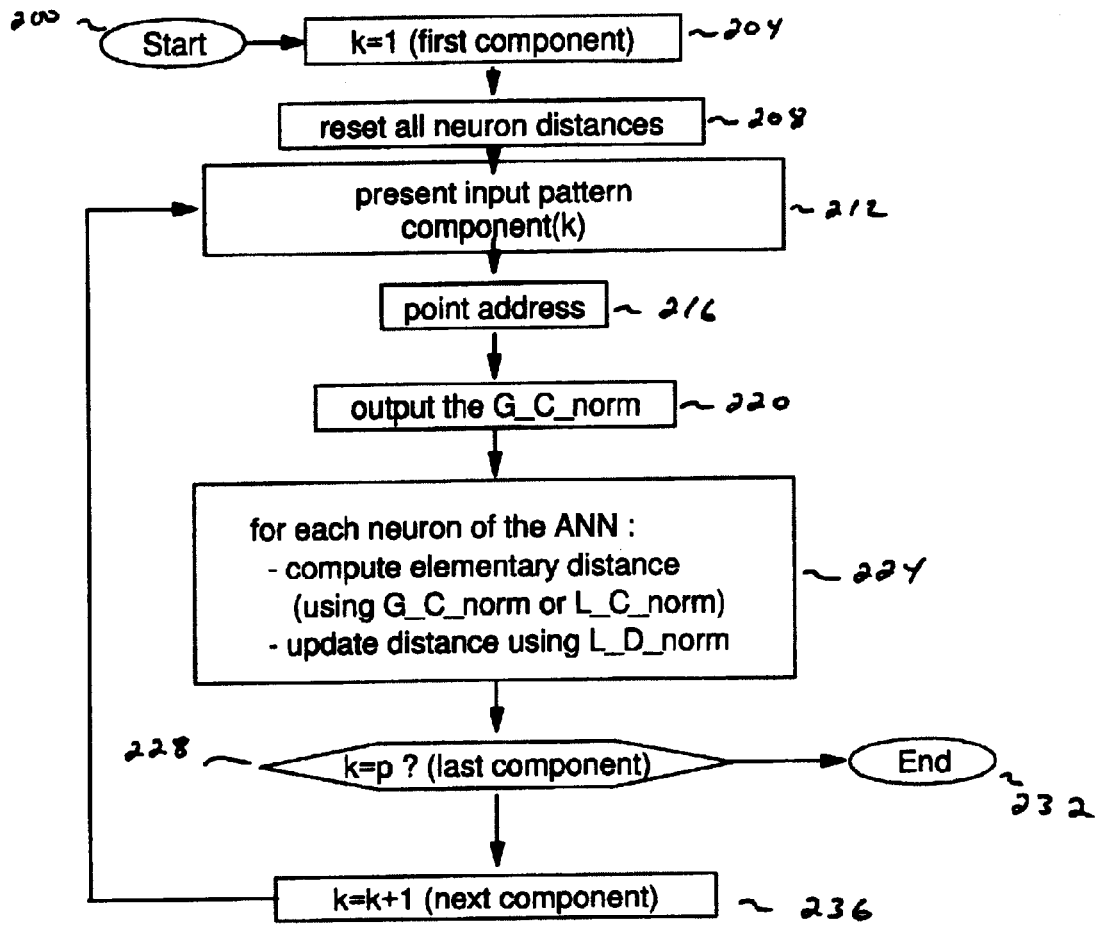
FIG. 2 is a flowchart summarizing the main steps of the method of the present invention.

FIG. 2 shows the flowchart which summarizes these processing steps.

The process for starting 200 the method for associating a component norm to each component 204 of an input pattern having P components stored in an external memory host (not shown) and to the corresponding component of all prototypes stored in the N neurons of an artificial neural network (ANN) in the process of evaluating the final distance between the input pattern and the prototypes for each neuron using a distance norm includes resetting 208 the final distance for each neuron to zero. Steps 212 and 216 presents the input pattern component corresponding to a point address for each neuron. Step 220 gets the component norm corresponding to the address in step 216. Step 224 computes the elementary distance using the component norm for each neuron and updates the distance using the distance norm for each neuron. Steps 228-236 repeats the above steps until all P components have been processed thereby allowing the evaluation of the final distance for each neuron.

Figure 3:
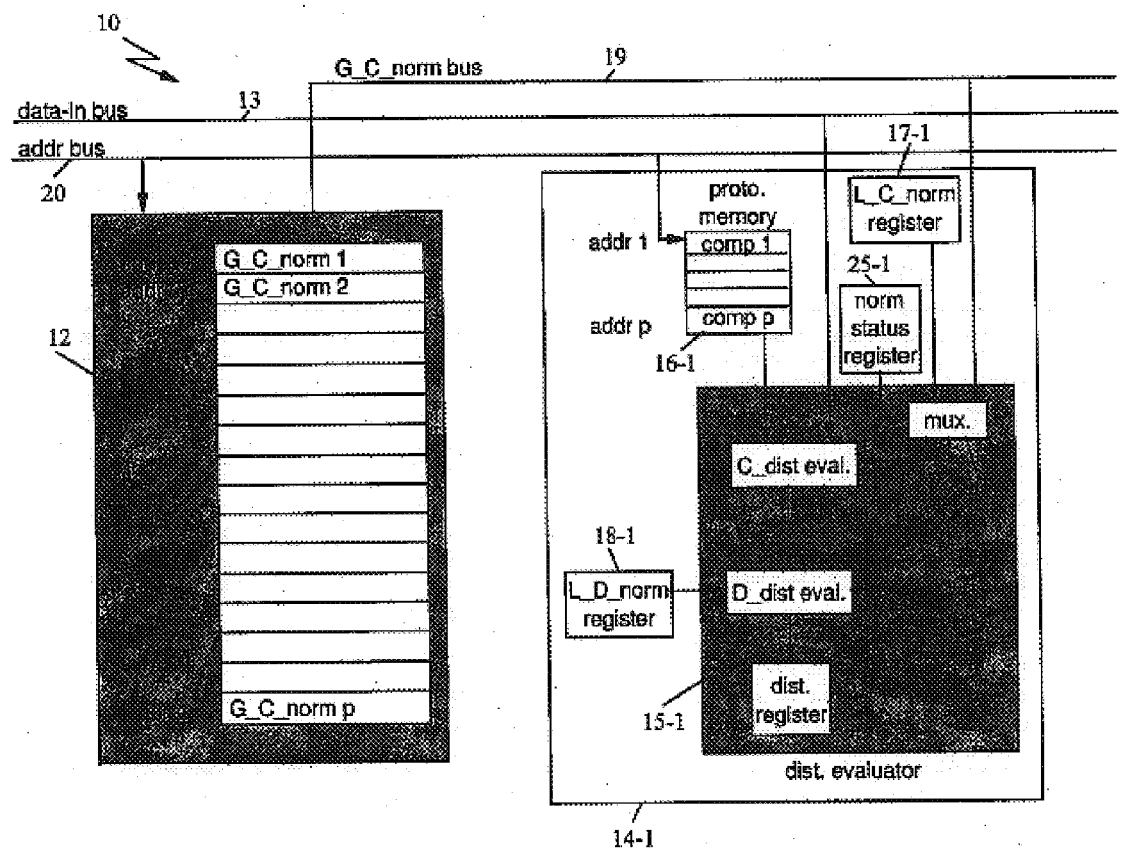
FIG. 3 shows the block architecture of FIG. 1 limited to one neuron to illustrate the internal organization of the global memory and the essential elements of a neuron.

FIG. 3 shows the architecture of FIG. 1 limited to the global memory and only one neuron. In particular it shows the internal organization of the global memory 12 used to memorize the G_C_norms and the essential elements of the first neuron 14-1, basically a ZISC neuron, now modified according to the teachings of the present invention.

The internal organization of global memory 12 is schematically shown on the left-hand side of FIG. 3. As apparent in FIG. 3, there are p memory locations corresponding to the p components of the input pattern/stored prototype that are accessed by an address (addr 1 to addr p) emitted by the host computer via addr bus 20. At each memory location, the coded value of the G_C_norm associated to an address is stored. Two successive addresses may represent either the same operator or two different operators. In the latter case, norms G_C_norm 1 and G_C_norm 2 which are stored at addr 1 and addr 2, may be, for instance, the absolute value of a difference and the match/no match operators respectively.

Now turning to the right-hand side of FIG. 3, the essential elements of the neuron 14-1 are shown in more details. Distance evaluator 15-1 first comprises blocks 21-1, 22-1 and 23-1. Block 21-1 is labeled C_dist eval because it performs the elementary distance calculation on a pair of corresponding components, i.e. of the same rank. This block is connected to the host computer via data-in bus 13 and to the prototype memory 16-1. Block 22-1 labeled D_dist eval is controlled by the operator representing the distance norm (e.g. the "maximum value" operator in case of the Lsup norm) stored in register 18-1 and updates the distance with the calculated elementary distances (partial results) as the count of components progresses. Block 23-1 labeled dist register stores the final distance when all the components have been processed. The distance evaluator 15-1 just as it is, the prototype memory 16-1 (connected to the host computer via addr bus 20) and register 18-1 that memorizes the L_D_norm are substantially consistent with the description given in the aforementioned U.S. patent. Now, according to the present invention, distance evaluator 15-1 further comprises a 2-way multiplexor 24-1 which is connected to register 17-1 on the one hand, and to the G_C_norm bus 19 on the other hand. Multiplexor 24-1 is controlled by a status bit stored in the norm status register 25-1 to select either the L_C_norm or the G_C_norm to be applied on the control input of block 21-1. However, the L_C_norm register 17-1, 1-bit norm status register 25-1 and multiplexor 24-1 are not mandatory blocks, the C_dist eval 21-1 can be directly controlled by the G_C_norms stored in global memory 12 via bus 19.

Each time an input pattern component is sent to neuron 14-1 by the host computer on data-in bus 13, the G_C_ norm stored in global memory 12 associated thereto (at an address defined by the host computer) is also simultaneously transmitted to improved neuron 14-1 via the G_C_norm bus 19. The prototype component (corresponding to that address) which is locally stored in the prototype memory 16-1 is directly available. It is the role of address bus 20 under the host computer control to perform the addressing function of both the global memory 12 and the prototype memory 16-1 as standard. Now, depending the binary value stored in the 1-bit norm status register 25-1 which controls multiplexor 24-1, either the L_C_norm memorized in register 17-1 or the G_C_norm stored in global memory 12 is selected. The selected norm is used to control block 21-1 in performing the elementary distance calculation on the pair of components in consideration. Then, using the L_D_ norm stored in the L_D_norm register 18-1, the distance between the input pattern and the stored prototype is updated in box 22-1 and, as it is practiced in the ZISC neuron, the distance evaluation is continued through a loop process, until all the components of the input pattern have been processed and the final distance "dist" has been evaluated and memorized in register 23-1. It is to be noted, that unlike in the ZISC ANN where the final distance is obtained with only either the L1 or the Lsup norm, this limitation does not exist any longer, the improved ANN 10 of the present invention offers much more flexibility in that respect.

Figure 4:
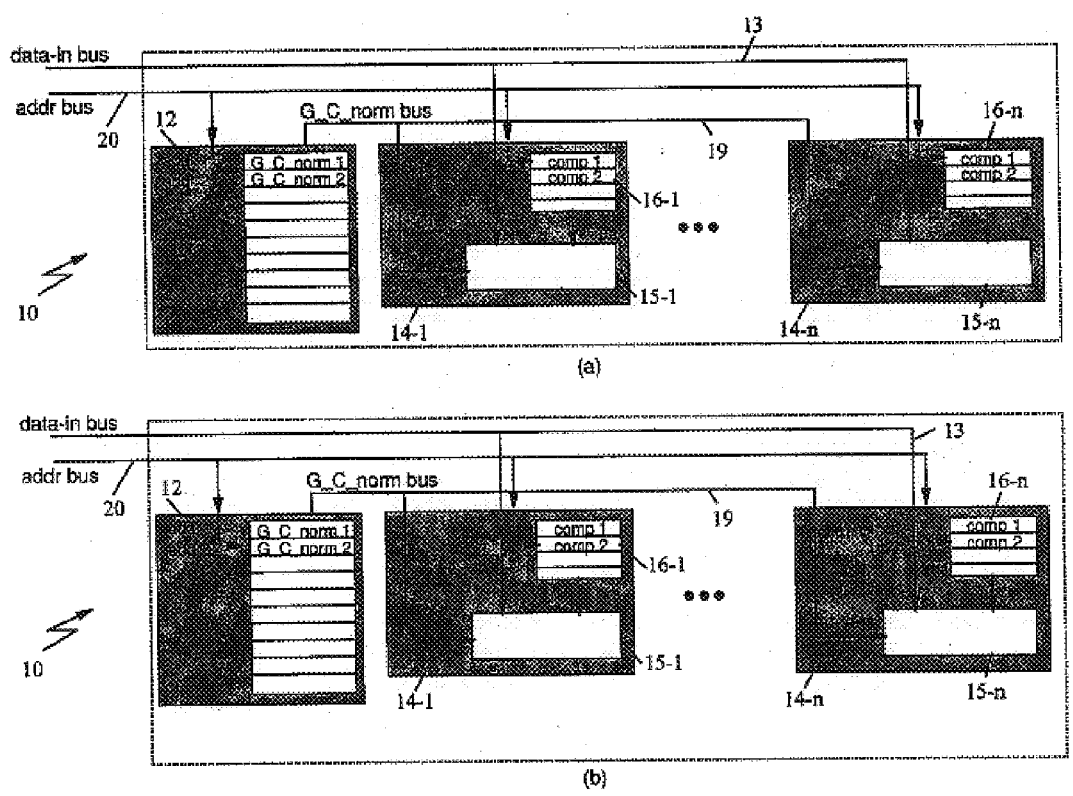
FIG. 4 illustrates the operation of the FIG. 1 having an improved ANN to point out the role of the address bus in the distance evaluation process to calculate the final distance between the input pattern and the stored prototypes possibly with a different norm for each component of the input pattern/stored prototypes.

The operation of the improved ANN 10 of FIG. 1 and in particular, the principle of the simultaneous processing of input pattern component and stored prototype component with their associated C_norm which is an essential feature of the present invention will be now described in more details by reference to FIG. 4. To each input pattern component, the host computer (or the control logic) emits an address which is used to simultaneously access the associated G_C_norm in the global memory 12 and the corresponding stored prototype component. Let us give a practical example. The first address (addr 1) selects G_C_norm 1 at the first location of global memory 12 and the first prototype component comp 1 in each prototype memory 16 of neurons 14-1 to 14-n as shown in FIG. 4a. Thus, when the first input pattern component is fed into the improved ANN 10, the G_C_norm 1 and the first prototype component comp 1 are simultaneously associated thereto for a first elementary distance calculation. Then, when the second input pattern component is fed into the improved ANN 10, it is associated the same way with the second norm G_C_ norm 2 and the second prototype component comp 2 at addr 2 as shown in FIG. 4b to update the partial result of said first elementary distance calculation. These steps are repeated until the last input pattern component has been processed. It has to be understood that if the addresses are consecutive in this example, it could be random addresses as well without any substantial hardware modifications.

When different kinds of prototypes are stored in an ANN, the selection of a determined kind of prototypes is performed using a context, i.e. a specific label assigned to each stored prototype as explained above. In this case, it could be useful to use a G_C_norm for each component which would depend upon the context. The architecture of improved ANN 10 is perfectly adapted to meet this objective because it is possible to implement as many global memories to memorize different G_C_norm configurations as desired.

Figure 5:
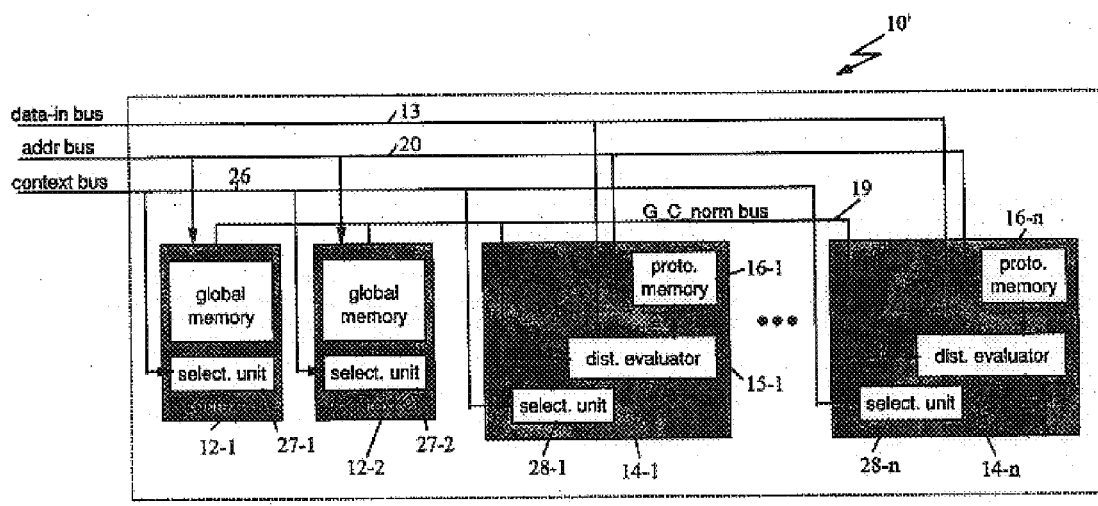
FIG. 5 shows the architecture of the FIG. 1 having an improved ANN that has been adapted to use several contexts by implementing a corresponding number of global memories.

FIG. 5 shows a variant of the improved ANN 10 of FIG. 1, now referenced 10", that has been adapted to handle two sets of G_C_norms instead of one according to another significant feature of the present invention by implementing two contexts. A determined set of G_C_norms is selected by the means of the context which also activates the adequate group of neurons in the improved ANN 10". Now turning to FIG. 5, the improved ANN 10" includes two global memories referenced 12-1 and 12-2 (for consistency with the above description) and a plurality of neurons still referenced 14-1 to 14-n. An additional bus, referred to as the context bus 26, connects a global context register in the host computer (or in the control logic) which stores the global context to dedicated blocks, referred to as selection units. These selection units are referenced 27-1 and 27-2 in the global memories 12-1 and 12-2 and 28-1 to 28-n in the neurons 14-1 to 14-n respectively. It is to be noted that similar selection units already exist in the ZISC neurons for the context implementation (they are not represented in neurons 14 shown in FIGS. 1 and 3 for the sake of clarity). In FIG. 5, the global memories and the neurons only differ from corresponding blocks 12 and 14 of FIG. 1 by the addition of said selection units. In essence, a selection unit 27 or 28 consists of a register which stores the local context and a comparator which performs a comparison between the global context selected by the host computer and the local context. Depending upon the result of that comparison, only a determined group of neurons is activated, the other neurons being inhibited. The architecture of improved ANN 10" is not limited to the implementation of two contexts as shown in FIG. 5 which then gives a high flexibility to the circuit designer. The operation of improved ANN 10" is basically the same as the improved ANN 10 described above by reference to FIGS. 4a and 4b.

However, the G_C_norm memorization means (in the case of FIG. 5, the two global memories 12-1 and 12-2) could be optimized to avoid the implementation of as many global memories as there are contexts. In some case, it may be worthwhile to avoid the memory waste that would occur if they were not totally exploited or when not really necessary. This objective is met still according to another significant feature of the present invention, by dedicating one neuron 14 (or more) to memorize the G_C_norms instead of the prototype components as it has been usually practiced so far. As a result, the global memory 12 is no longer physically required, its function being efficiently fulfilled by such a dedicated neuron. To that end, a new flag bit, referred to as the function flag bit, is assigned to each neuron to give its function: G_C_norm memorization or prototype component memorization. In the first case, only the memory and context selection functions of the neuron will be exploited while in the second case, it works as standard to perform the distance evaluation.

Figure 6:
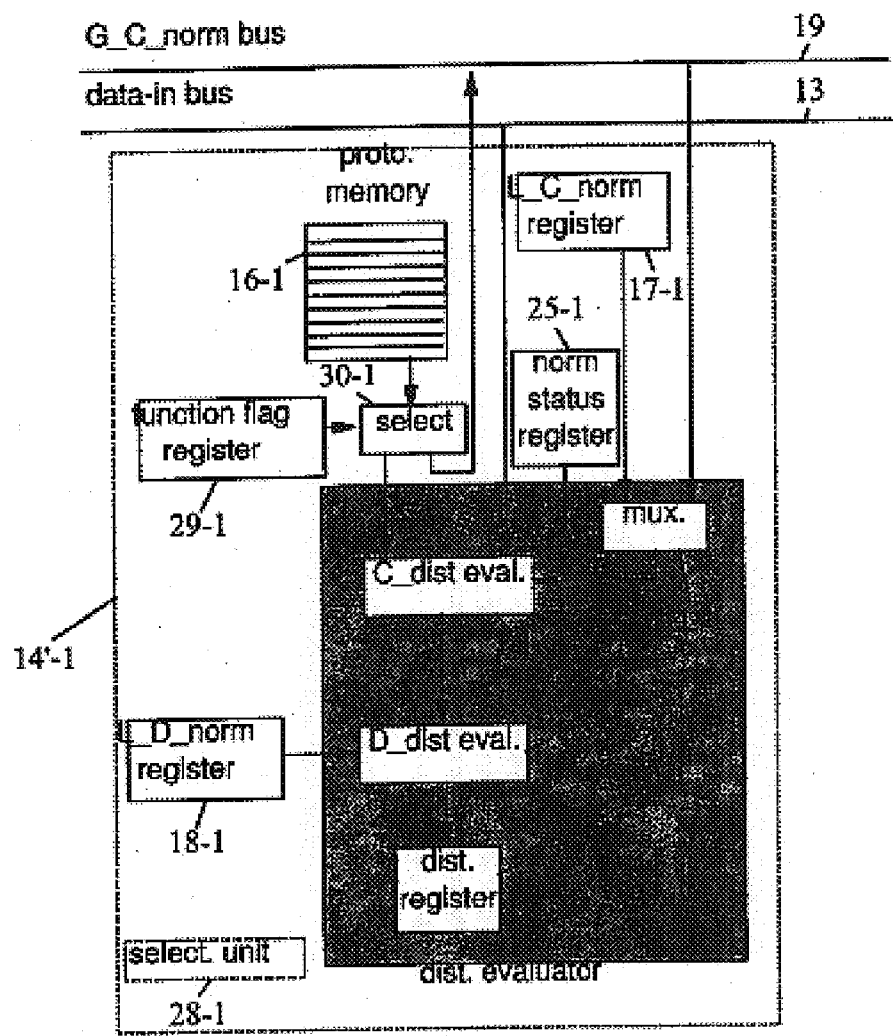
FIG. 6 shows the neuron of FIG. 3 that has been modified to add the ability to internally fulfill the global memory function still according to the present invention.

Turning to FIG. 6, the improved neuron, now referenced 14"-1, has an internal construction which directly derives from the one of neuron 14-1 of FIG. 1. The function flag bit mentioned above is stored in a function flag register referenced 29-1 which controls selector 30-1. Depending upon the function flag bit value, selector 30-1 either applies a prototype component to the C-dist evaluator 21-1 or transmits a G_C_norm to the G_C_norm bus 19 for exploitation by all the selected neurons connected thereon. Therefore, neuron 14"-1 has two operating modes. In the first mode, neuron 14"-1 operates like neuron 14-1, while in the second mode, it plays the role of the global memory 12 (at the only cost of adding the function flag register 29-1 and the selector 30-1). Consequently, the prototype memory 16-1 in neuron 14"-1 is now adapted to store two different types of data: prototype components or G_C_norms.

Figure 7:
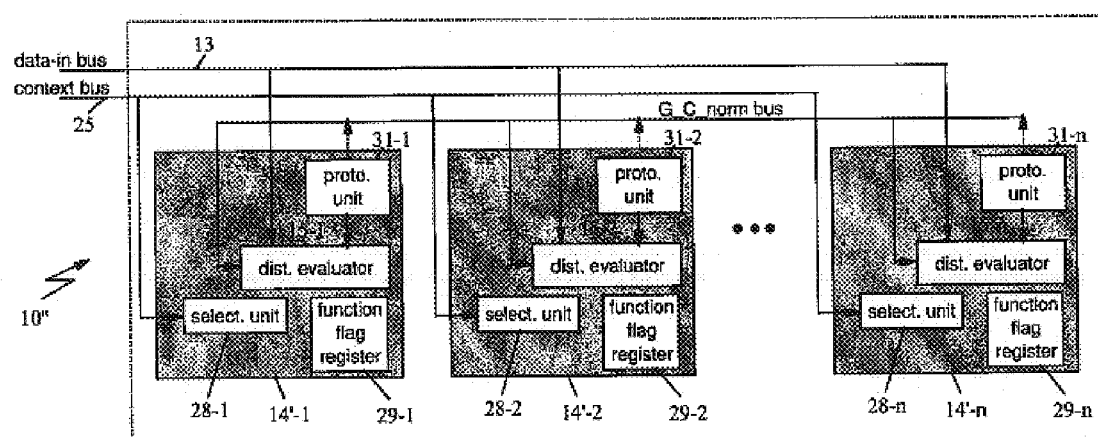
FIG. 7 shows the block architecture of the improved ANN of FIG. 1 incorporating the neuron of FIG. 6 to optimize the consumed silicon area when the improved ANN is integrated in a silicon chip.

FIG. 7 shows the architecture of the improved ANN 10 of FIG. 1 when the improved neuron of FIG. 6 is used to memorize the G_C_norms still according to the present invention. This variant, referenced 10", allows to reduce the amount of memory that is required for G_C_norm memorization. In FIG. 7, some circuit blocks shown in neuron 14"-1 of FIG. 6 have been merged in an unit labeled prototype unit referenced 31-1. The dedicated neuron containing the G_C_norms is selected thanks to its selection unit (for the context) and its function flag register (for its operating mode). Each time an input pattern component is fed into the improved ANN 10", the adequate G_C_norm, memorized in its prototype unit, is output and associated thereto for distance evaluation in all the other remaining neurons of the ANN 10".

Figure 8:
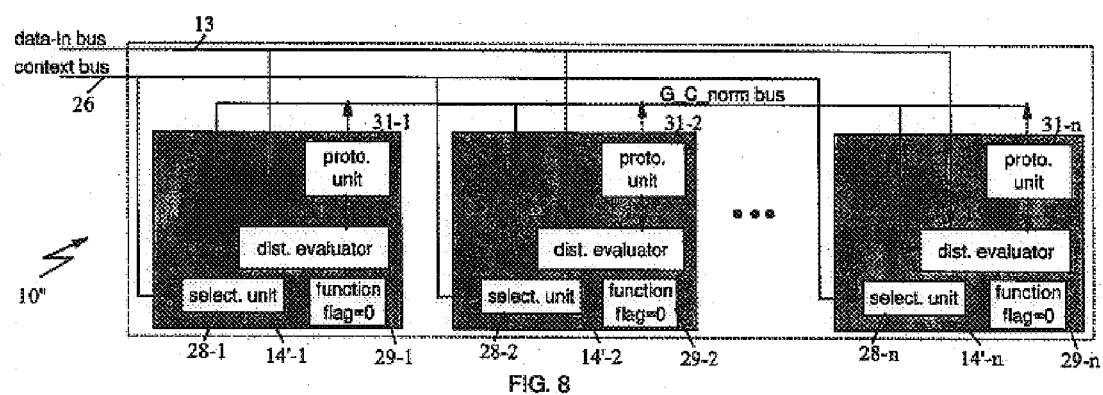
FIG. 8 illustrates the operation of the FIG. 7 having an improved ANN and in particular the role of the function flag register when no context is implemented.
Figure 9:
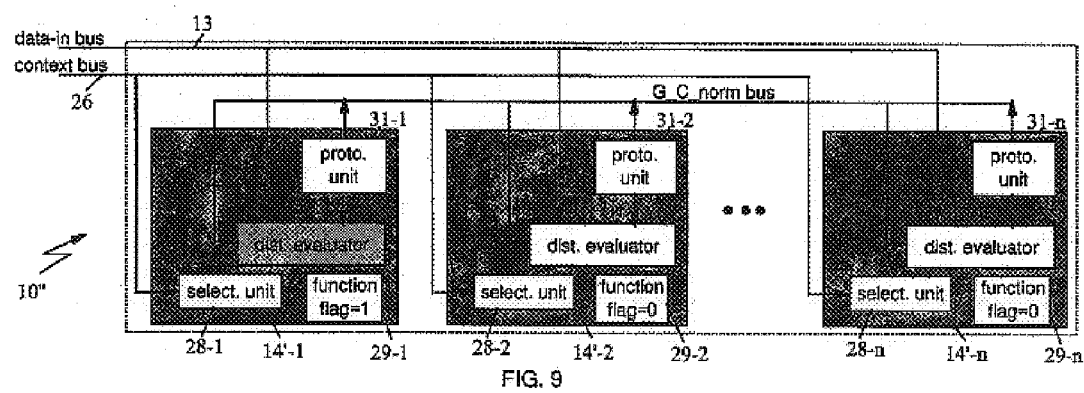
FIG. 9 illustrates the operation of the FIG. 7 having an improved ANN and in particular the role of the function flag register when one context is implemented.

The operation of improved ANN 10" of FIG. 7 will be illustrated by reference to FIGS. 8 and 9. FIG. 8 illustrates the case where there is no need to dedicate an improved neuron to store the G_C_norms. In this case, all the function flag registers hold a zero and the all the neurons 14" operate as standard, the default norm (for example L1) is used for the distance evaluation.

When a single context is used and when different G_C_norms are required for the input pattern components, only one improved neuron is required to perform this task. Now turning to FIG. 9, assuming improved neuron 14"-1 is dedicated to memorize the G_C_norms, its function flag register 29-1 is set to one. As a consequence, the memorization means of its prototype unit 31-1 are used to store the G_C_norms and its distance evaluator 15-1 is inhibited. This can be generalized to several contexts. As many improved neurons will be then dedicated for the G_C_norm memorization task as they are different contexts, i.e. their function flag register is set to one and their memorization means only used to memorize the G_C_norms.

The above described method can be even further generalized to the evaluation of distances in parallel computing systems.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

What is claimed is:

1. An improved Artificial Neural Network (ANN) adapted to associate a component norm (C_norm) to each component of an input pattern having p components in the process of evaluating the final distance between the input pattern and the prototypes stored in the neurons of the ANN comprising:
   a data-in transmitter for applying input patterns components to each neuron;
   a global memorization device to store the p component norms and apply said p component norms to each neuron;
   a plurality of n neurons; each neuron comprising:
      a prototype memory to store the p components of a prototype; and,
      distance evaluator connected to said prototype memory, to said global memorization device and to said data-in transmitter;
   an addressing device for simultaneously applying the input pattern component, the corresponding component norm associated therewith and the corresponding stored prototype component to said distance evaluation means in each neuron;
   an applier for applying a distance norm (D_norm) to the distance evaluator; wherein said distance evaluator is adapted to perform the elementary (or partial) distance calculation between the corresponding components of the input pattern and the stored prototype using the corresponding component norm associated thereto and to combine said elementary calculations in the distance evaluation process to determine the final distance using a distance norm (D_norm).

2. The improved ANN of claim 1 wherein said global memorization device consist of a physical memory common to all the neurons of the ANN to memorize the component norms referred to as the global component norms (G_C_norms).

3. The improved ANN of claim 1 wherein said global memorization device consist of a dedicated memory placed in each neuron to memorize the component norms referred to as the local component norms (L_C_norms).

4. The improved ANN of claim 1 wherein said global memorization device consist of a physical global memory common to all the neurons of the ANN to memorize the component norms referred to as the global component norms (G_C_norms) and a plurality of dedicated memories placed in each neuron to memorize the component norms referred to as the local component norms (L_C_norms).

5. The improved ANN of claim 4 further comprising a selector for selecting either the G_C_norms or the L_C_norms as the C_norms.

6. The improved ANN of claim 1 wherein said applier for applying the distance norm (D_norm) consist of either a register common to all the neurons (G_D_norm) or a local register in each neuron (L_D_norm).

7. An improved Artificial Neural Network (ANN) adapted to associate a component norm (C_norm) to each component of an input pattern having p components in the process of evaluating the final distance between the input pattern and the prototypes stored in the neurons of the ANN that is adapted to be partitioned in m groups of neurons corresponding to m different global contexts comprising:
   data-in transmitter for applying input patterns components to each neuron;
   context transmitter for applying a global context to each neuron;
   a plurality of m global memorization devices connected to said context transmitter adapted to store the p component norms with a determined context and apply said p component norms to each neuron via a C_norm bus; each global memorization device comprising:
      a memory to store the p component norms; and,
      device for storing the local context and means responsive to the global context and adapted to make a comparison with a local context stored therein to activate only neurons whose local context matches the global context and inhibit others;
   a plurality of n neurons; each neuron comprising:
      a prototype memory to store the p components of a prototype; and, a distance evaluator connected to said prototype memory, to said global memorization device and to said data-in transmitter;

a storage for storing the local context and a response device being responsive to the global context and adapted to make a comparison with a local context stored therein to activate only neurons whose local context matches the global context and inhibit others;

an address device for simultaneously applying the input pattern component, the corresponding component norm associated therewith and the corresponding stored prototype component to said distance evaluation means in each neuron;

an applier for applying a distance norm (D_norm) to the distance evaluation means;

wherein said distance evaluator is adapted to perform the elementary (or partial) distance calculation between the corresponding components of the input pattern and the stored prototype using the corresponding component norm associated thereto and to combine said elementary calculations in the distance evaluation process to determine the final distance using a distance norm (D_norm).

8. An improved Artificial Neural Network (ANN) adapted to associate a component norm (C_norm) to each component of an input pattern having p components in the process of evaluating the final distance between the input pattern and the prototypes stored in the neurons of the ANN comprising:

data-in transmitter for applying input patterns components to each neuron;

a plurality of n neurons; each neuron comprising:

a memory capable to store either the p components of a prototype or the p component norms and apply said p component norms to each neuron via a c_norm bus;

an applier adapted to apply either the prototype components to an distance evaluator (standard mode) or the p component norms to each neuron via a C_norm bus (C_norm mode);

a selector adapted to select either mode; and, a distance evaluator connected to said prototype memory, to a global memorization device and to said data-in transmitter;

storage for storing the local context and a response device being responsive to the global context and adapted to make a comparison with a local context stored therein to activate only neurons whose local context matches the global context and inhibit others;

an address device for simultaneously applying the input pattern component, the corresponding component norm associated therewith and the corresponding stored prototype component to said distance evaluation means in each neuron;

an applier for applying a distance norm (D_norm) to the distance evaluation means;

wherein said distance evaluator is adapted to perform the elementary (or partial) distance calculation between the corresponding components of the input pattern and the stored prototype using the corresponding component norm associated thereto and to combine said elementary calculations in the distance evaluation process to determine the final distance using a distance norm (D_norm).

9. An improved Artificial Neural Network (ANN) adapted to associate a component norm (C_norm) to each component of an input pattern having p components in the process of evaluating the final distance between the input pattern and the prototypes stored in the neurons of the ANN that is adapted to be partitioned in m groups of neurons corresponding to m different global contexts comprising:

data-in transmitter for applying input patterns components to each neuron;

a plurality of n neurons; each neuron comprising:

a memory capable to store either the p components of a prototype or the p component norms and apply said p component norms to each neuron via a c_norm bus;

an applier adapted to apply either the prototype components to an distance evaluator (standard mode) or the p component norms to each neuron via a C_norm bus (C_norm mode);

a selector adapted to select either mode; and, a distance evaluator connected to said prototype memory, to a global memorization device and to said data-in transmitter;

storage for storing the local context and a response device being responsive to the global context and adapted to make a comparison with a local context stored therein to activate only neurons whose local context matches the global context and inhibit others;

an address device for simultaneously applying the input pattern component, the corresponding component norm associated therewith and the corresponding stored prototype component to said distance evaluation means in each neuron;

an applier for applying a distance norm (D_norm) to the distance evaluation means;

wherein said distance evaluator is adapted to perform the elementary (or partial) distance calculation between the corresponding components of the input pattern and the stored prototype using the corresponding component norm associated thereto and to combine said elementary calculations in the distance evaluation process to determine the final distance using a distance norm (D_norm).

10. A method for associating a component norm to each component of an input pattern (having p components) stored in an external memory (host) and to the corresponding component of all prototypes stored in the n neurons of an artificial neural network (ANN) in the process of evaluating the final distance between said input pattern and the prototypes for each neuron using a distance norm comprising the steps of:

a) reset the final distance for each neuron to zero;

b) point address corresponding to a component;

c) present the input pattern component corresponding to that address to each neuron;

d) get the component norm corresponding to that address;

e) compute the elementary distance using the component norm for each neuron;

f) update the distance using the distance norm for each neuron; and, g) repeat step b through step f until all p components have been processed thereby allowing the evaluation of the final distance for each neuron.

11. A method for associating a component norm to each component of an input pattern (having p components) stored in an external memory (host) and to the corresponding component of at least one group of prototypes stored in the n neurons of an artificial neural network (ANN) partitioned in a an plurality of m groups having each a determined context in the process of evaluating the final distance between said input pattern and the prototypes for each neuron of said at least one group using a distance norm comprising the steps of:

a) set a context value;

b) reset to zero the final distance for each neuron having this context value;

c) point address corresponding to a component;

d) present the input pattern component corresponding to that address to each neuron having this context value;

e) get the component norm corresponding to that address;

f) compute the elementary distance using the component norm for each of said neurons having this context value;

g) update the distance using the distance norm for each of said neurons having this context value;

h) repeat step c through step g until all p components have been processed thereby allowing the evaluation of the final distance for each of said neurons having this context value.

* * * * *